July 24, 1956 A. W. WANZER 2,755,766
OUTBOARD PROPELLER MECHANISM FOR A VESSEL
Filed April 14, 1954 11 Sheets-Sheet 2
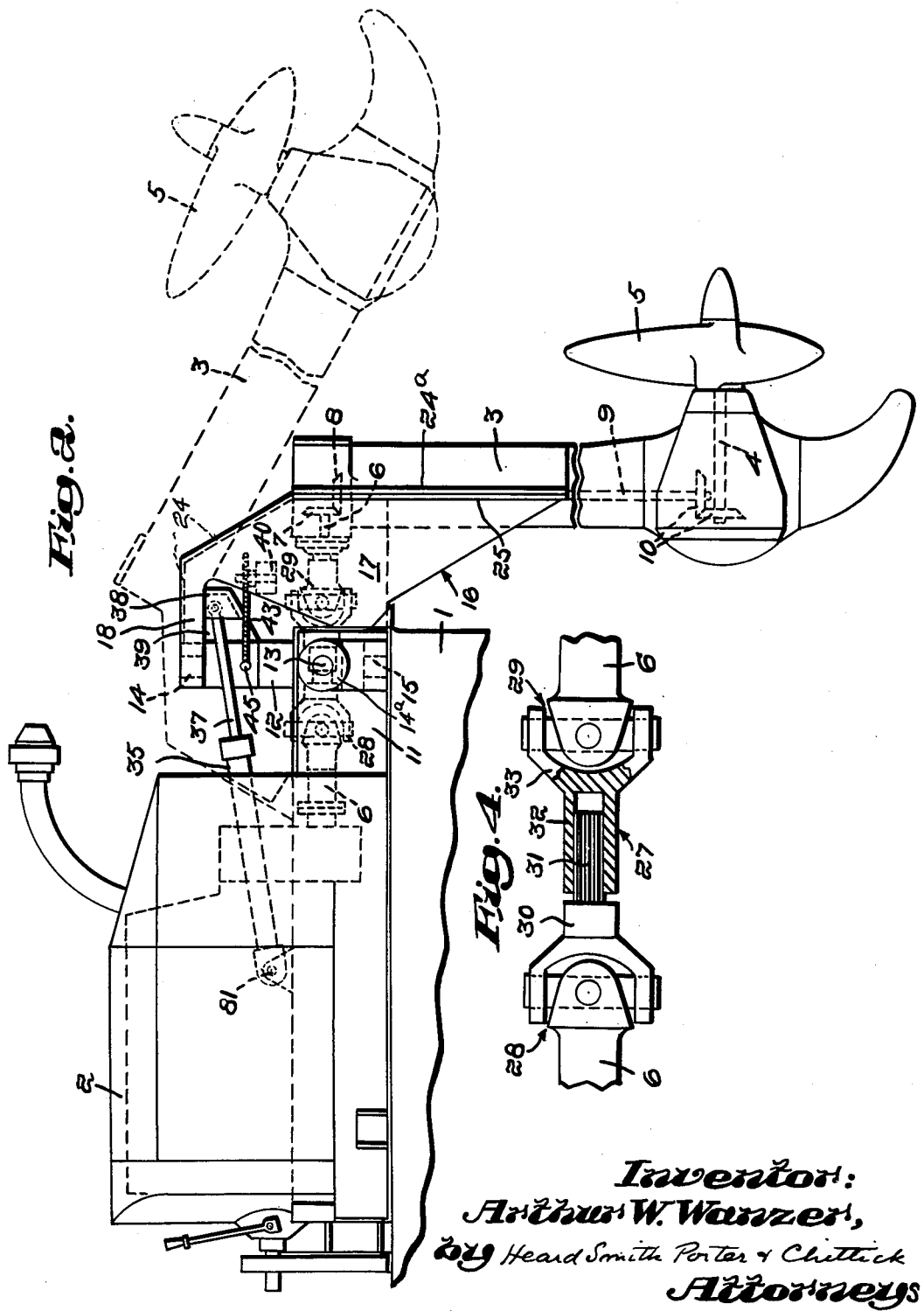
Inventor:
Arthur W. Wanzer,
by Heard Smith Porter & Chittick
Attorneys

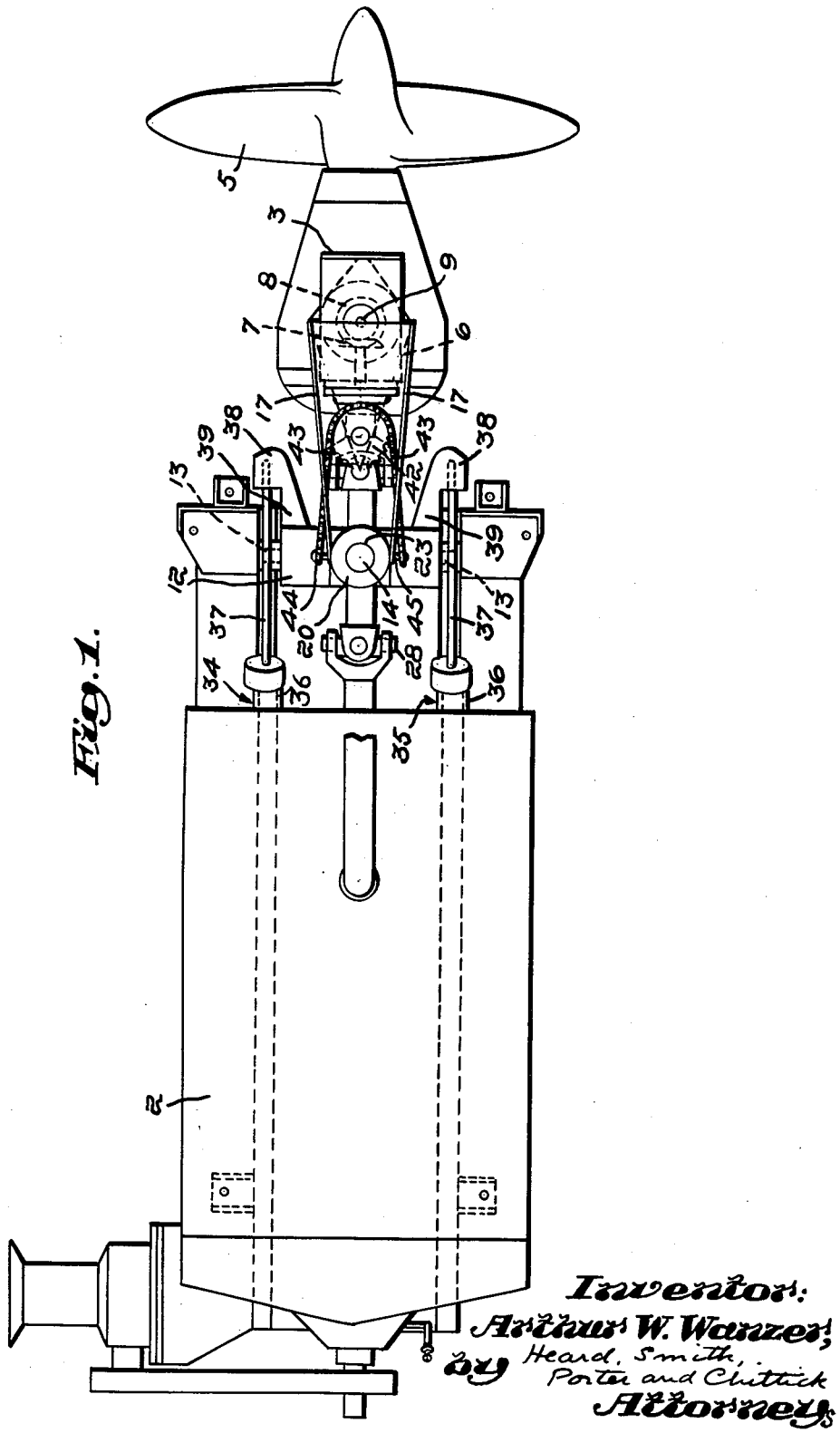

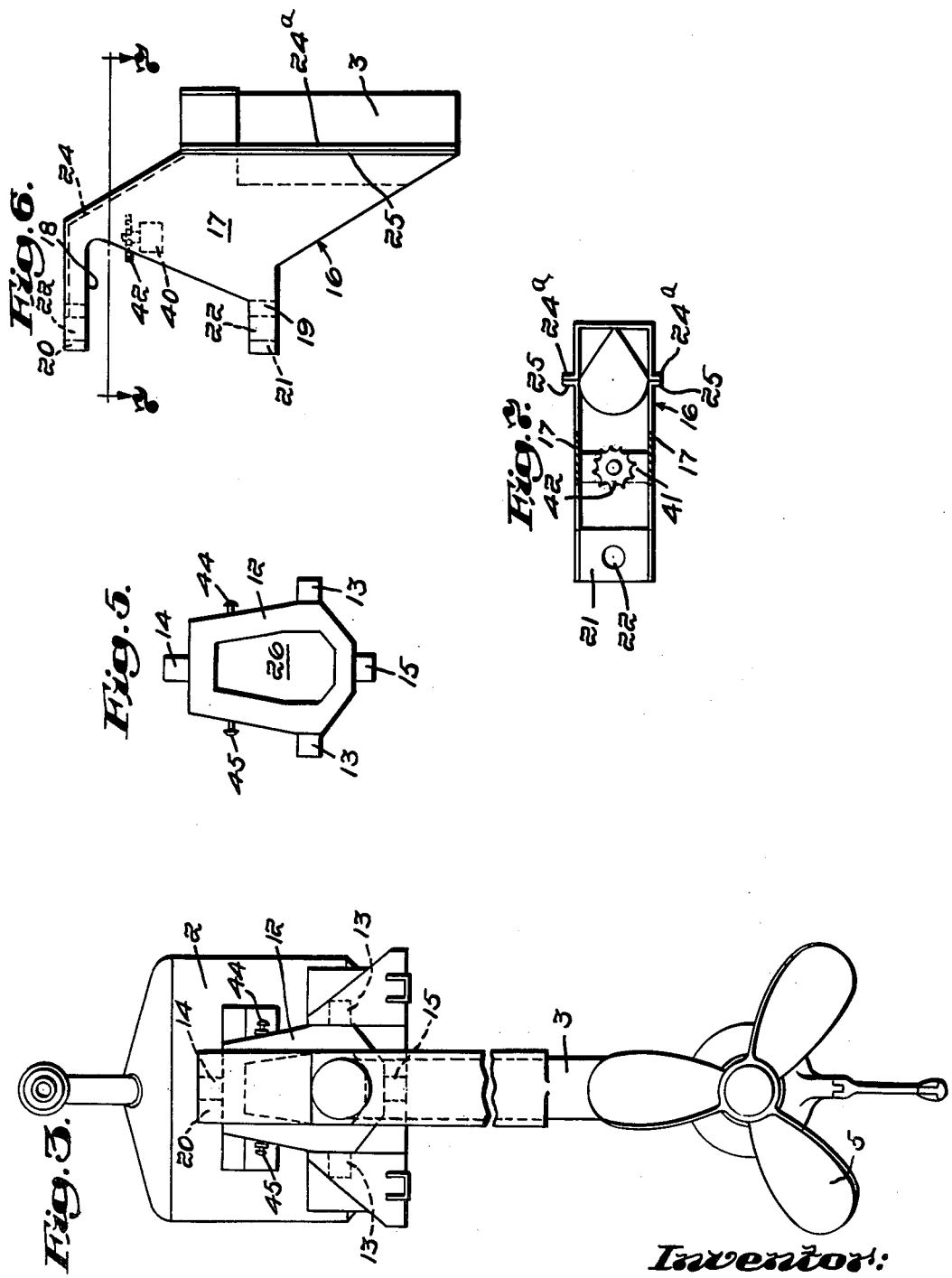

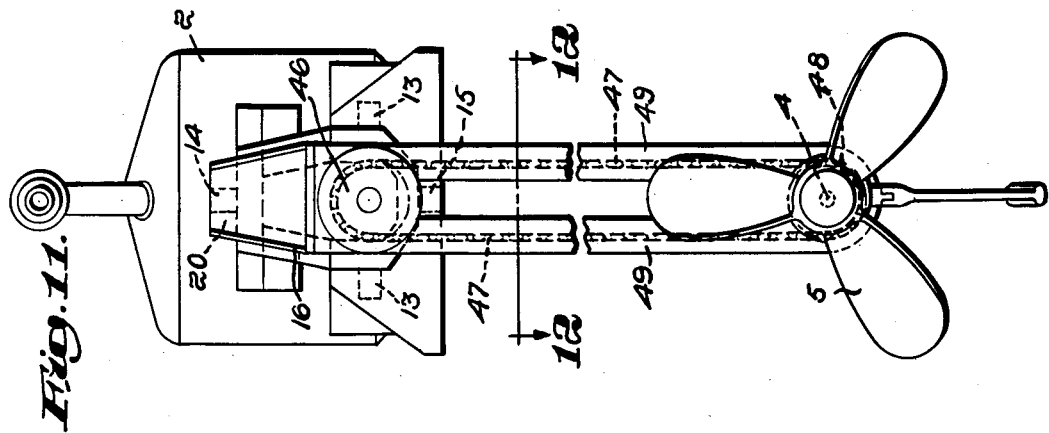

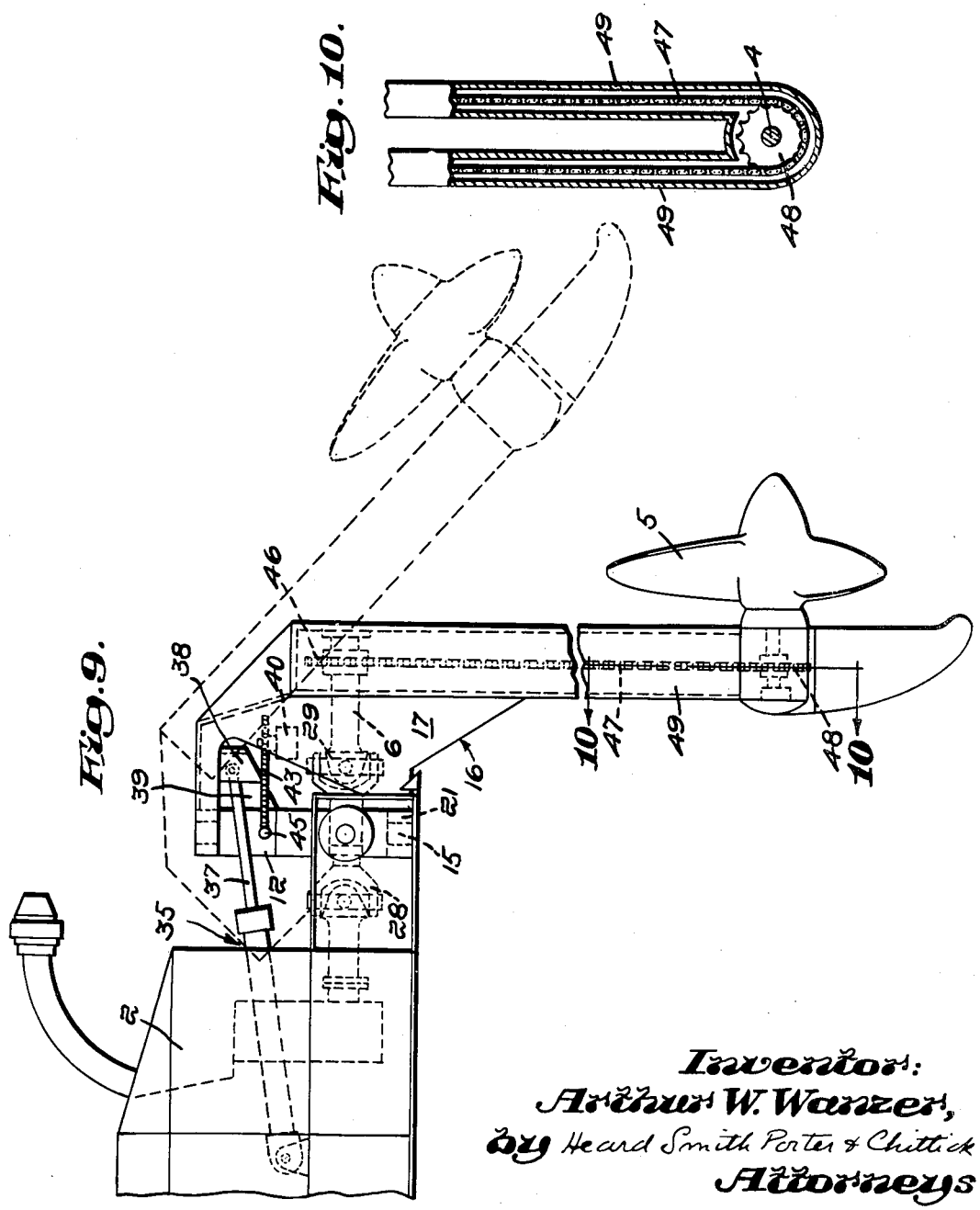

July 24, 1956  A. W. WANZER  2,755,766
OUTBOARD PROPELLER MECHANISM FOR A VESSEL
Filed April 14, 1954  11 Sheets-Sheet 6
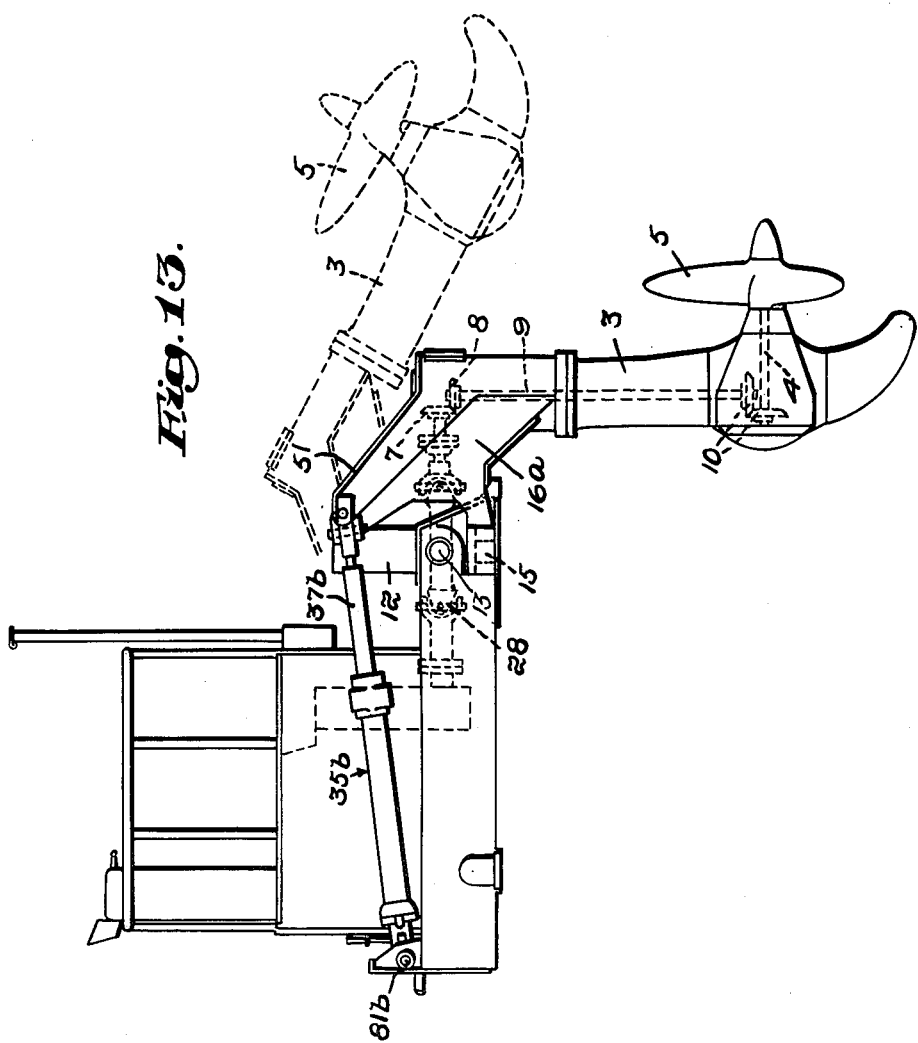
Inventor:
Arthur W. Wanzer,
by Heard Smith Porter & Chittick
Attorneys July 24, 1956 A. W. WANZER 2,755,766
OUTBOARD PROPELLER MECHANISM FOR A VESSEL
Filed April 14, 1954 11 Sheets-Sheet 7
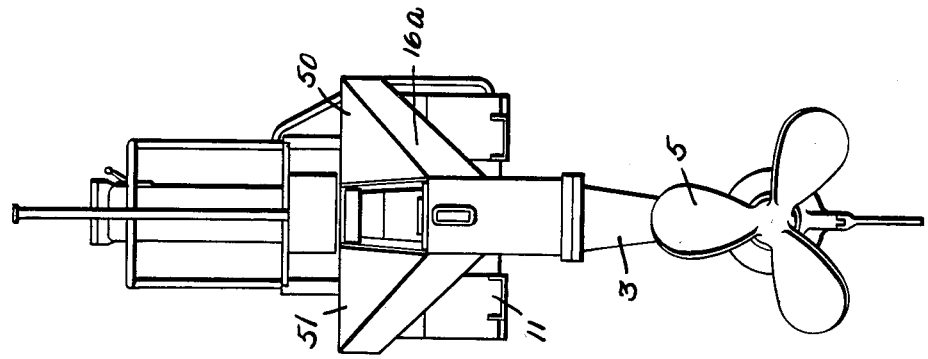
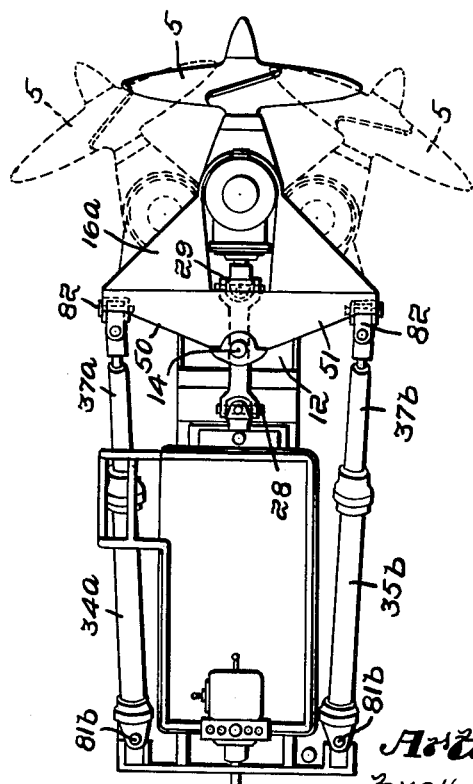
Inventor:
Arthur W. Wanzer,
by Heard Smith Porter & Chittick
Attorneys July 24, 1956 A. W. WANZER 2,755,766
OUTBOARD PROPELLER MECHANISM FOR A VESSEL
Filed April 14, 1954 11 Sheets-Sheet 8
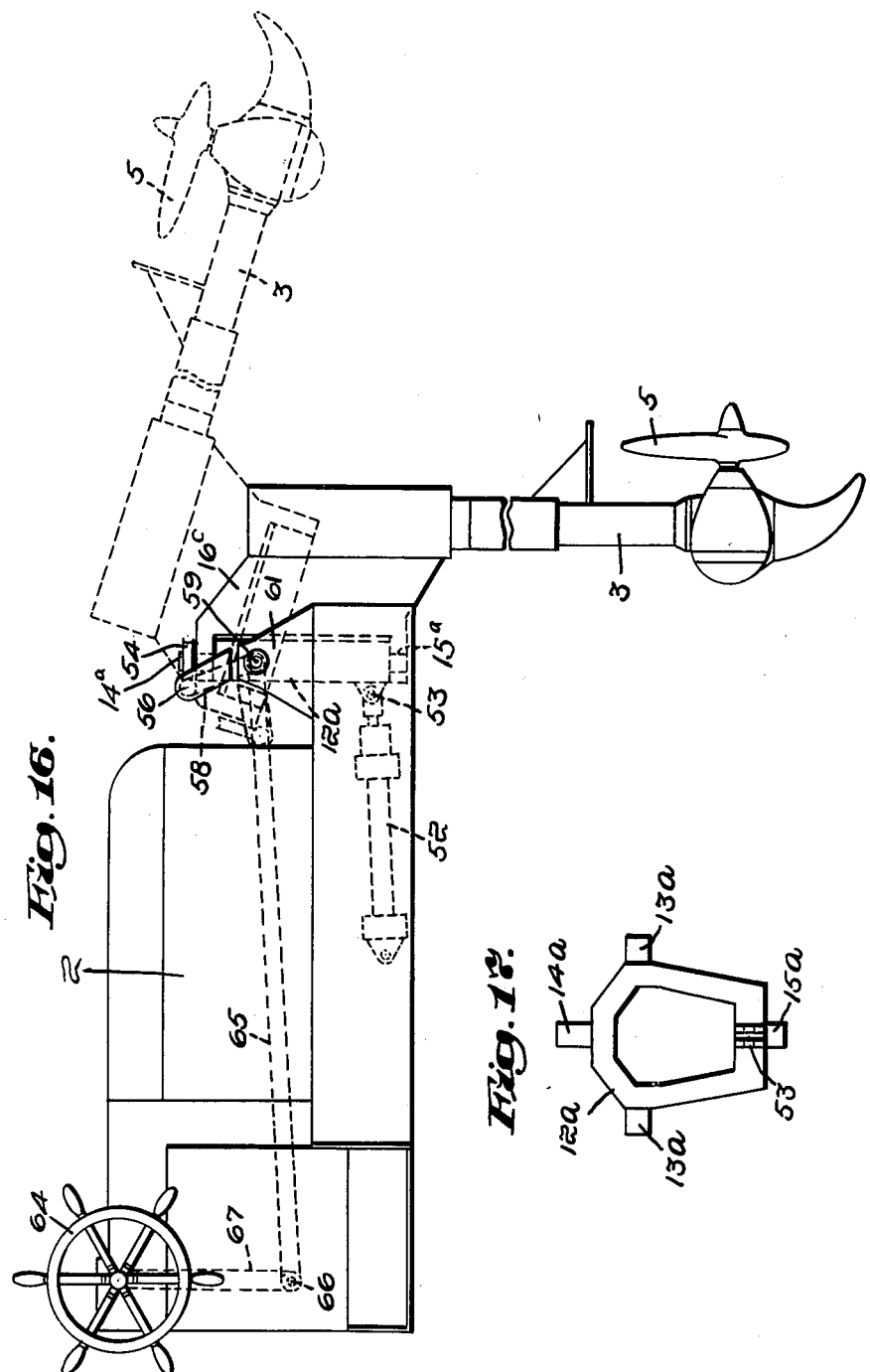
Inventor:
Arthur W. Wanzer,
by Heard Smith Porter & Chittick
Attorneys July 24, 1956 A. W. WANZER 2,755,766
OUTBOARD PROPELLER MECHANISM FOR A VESSEL
Filed April 14, 1954 11 Sheets-Sheet 9

Inventor:
Arthur W. Wanzer,
by Heard Smith Porter & Chittick
Attorneys

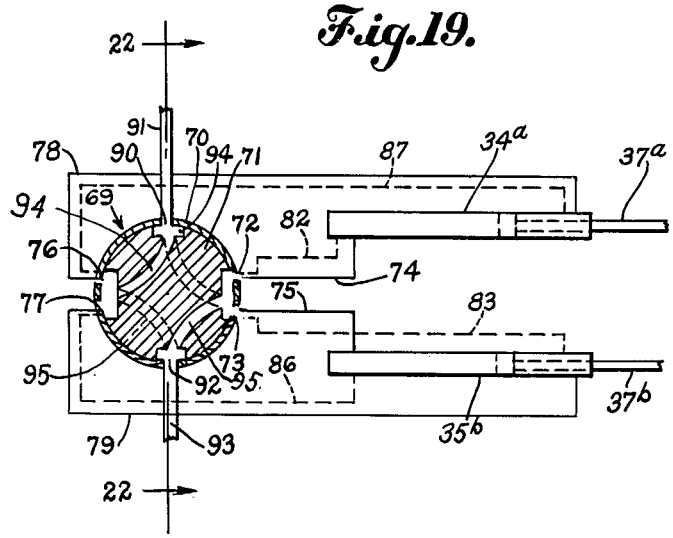
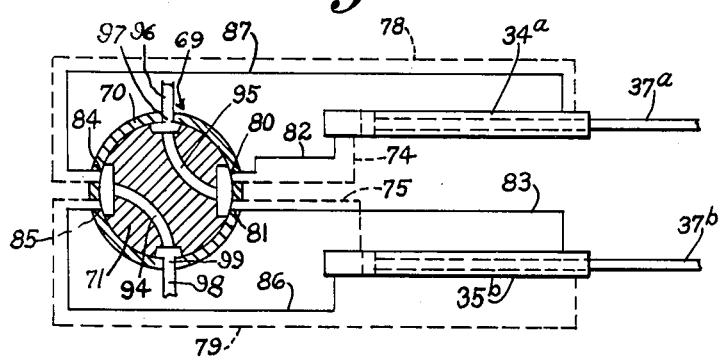
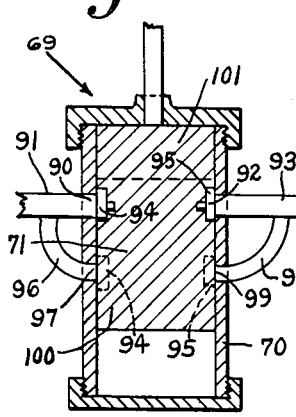
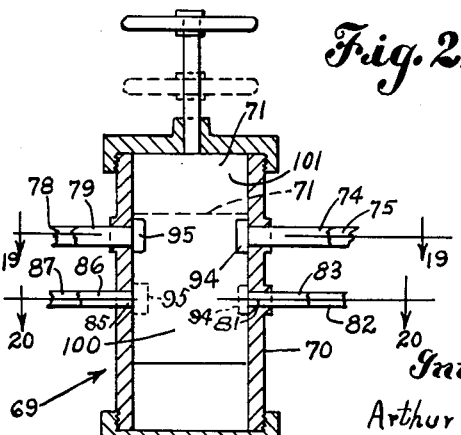

July 24, 1956  A. W. WANZER  2,755,766
OUTBOARD PROPELLER MECHANISM FOR A VESSEL
Filed April 14, 1954  11 Sheets-Sheet 11
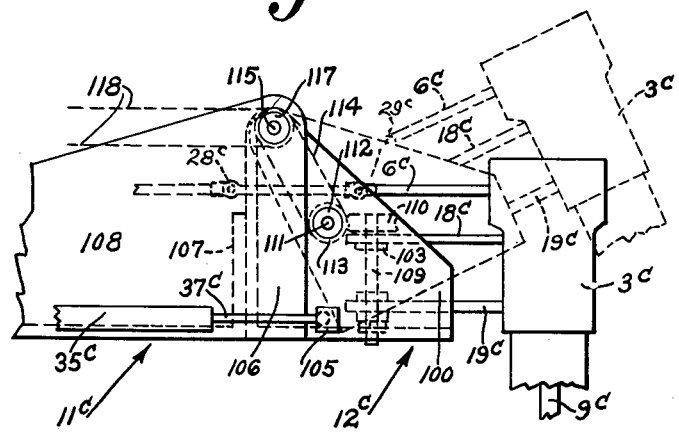
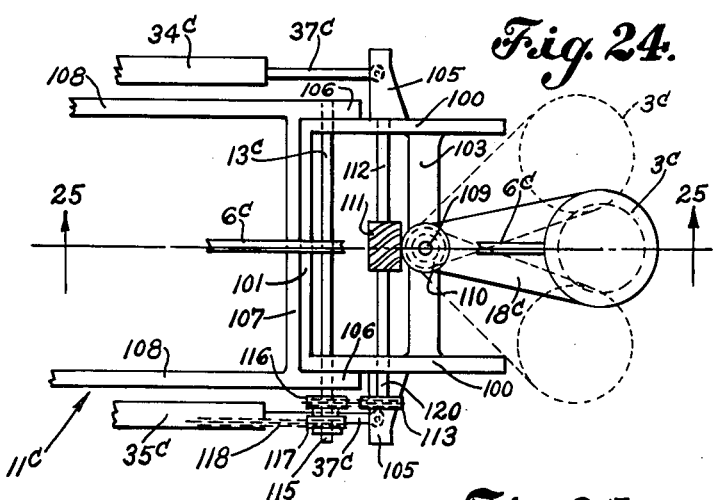
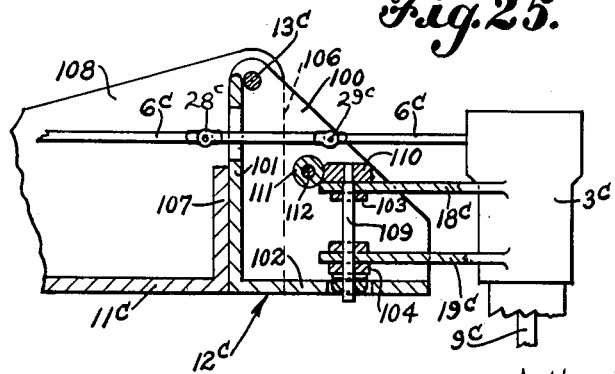
INVENTOR.
Arthur W. Wanzer
BY Heard Smith
Porter & Chittick
Attorneys United States Patent Office
2,755,766
Patented July 24, 1956

2,755,766

OUTBOARD PROPELLER MECHANISM FOR A VESSEL

Arthur W. Wanzer, Hingham, Mass.

Application April 14, 1954, Serial No. 423,116

9 Claims. (Cl. 115—35)

This invention relates to outboard propeller mechanism for barges, scows, and similar vessels, and especially to outboard propeller mechanism of that known type in which the propeller is mounted on the lower end of a propeller housing that in turn is carried by a base or supporting frame mounted on the deck of the vessel, the connection between the propeller housing and the supporting base being such that said housing can be turned about a horizontal axis for raising the propeller from the water and can also be turned about a vertical axis for steering the boat.

Examples of outboard propeller mechanism of this type will be found in my United States Patents Nos. 2,458,813, January 11, 1949, 2,499,339, February 28, 1950, and 2,536,849, January 2, 1951. In the devices shown in the above patents the vertical axis about which the propeller housing turns for steering the boat is located within the housing.

One object of the present invention is to provide improved means for mounting the vertically extending propeller housing on the supporting base so as to provide for both swinging the propeller housing and the propeller upwardly to raise the propeller from the water and to turn the propeller housing about a vertical axis other than its axis for steering the vessel.

In accordance with the present invention the propeller housing is carried by a supporting member which is mounted on the supporting base to turn about a horizontal axis and said propeller housing being pivotally mounted on said supporting member to turn about a vertical axis other than the axis of said housing. Moreover in the present invention the driving mechanism by which power is transmitted to the propeller is separate and independent from the supporting member to which the propeller housing is connected.

In the drawings, wherein I have illustrated some selected embodiments of the invention, Fig. 1 is a plan view of an outboard propeller mechanism which shows one embodiment of the invention;

Fig. 2 is a side view of Fig. 1;

Fig. 3 is an end view of Fig. 2;

Fig. 4 is an enlarged fragmentary view, partially in section, showing the flexible portion of the power shaft;

Fig. 5 is a view of the gimbal member by which the propeller housing is supported;

Fig. 6 is a view showing the mounting member by which the vertically extending propeller housing is mounted on the gimbal member;

Fig. 7 is a section on the line 7—7, Fig. 6;

Fig. 8 is a plan view of an outboard propeller mechanism showing a different manner of transmitting power from the power shaft to the propeller shaft;

Fig. 9 is a side view of Fig. 8;

Fig. 10 is a fragmentary view showing in section the lower portion of the propeller housing illustrated in Figs. 8 and 9;

Fig. 11 is an end view of Fig. 9;

Fig. 12 is a section on the line 12—12, Fig. 11;

Fig. 13 is a side view showing another embodiment of the invention;

Fig. 14 is a plan view of Fig. 13;

Fig. 15 is an end view of Fig. 13;

Fig. 16 is a side view of an outboard propeller mechanism having a different construction from that shown in any of the other views;

Fig. 17 is a view of the gimbal member shown in Fig. 16;

Figs. 19 and 20 are diagrammatic views illustrating one way in which the hydraulic jacks may be controlled;

Fig. 21 is a section through the controlling valve on the line 21—21 of Fig. 19;

Fig. 22 is a sectional view on the line 22—22, Fig. 21;

Fig. 23 is a fragmentary side view showing a different embodiment of the invention;

Fig. 24 is a plan view of Fig. 23;

Fig. 25 is a section on the line 25—25, Fig. 24.

Figure 18:
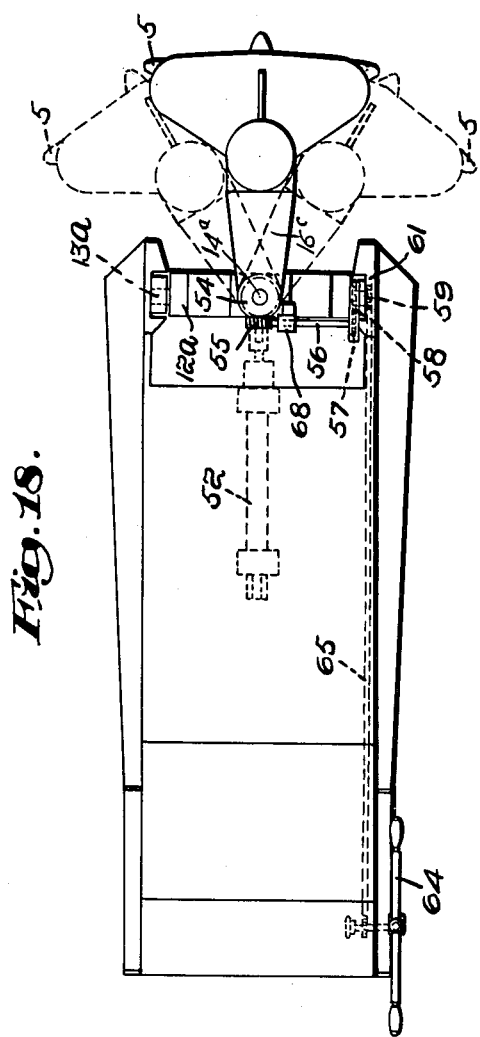
Fig. 18 shows another embodiment of the invention.

In the drawings 1 indicates a vessel, which may be a barge, a scow, or any other suitable vessel, on which is mounted an outboard propeller mechanism embodying my invention. Said outboard propeller mechanism includes a power element which may be an internal combustion engine and which may be housed in a suitable housing 2, a vertically extending propeller housing 3 carrying at its lower end a propeller shaft 4 on which is mounted a propeller 5. The propeller shaft 4 is driven from the power shaft 6 of the motor, and as shown in Figs. 1 and 2 said power shaft has a beveled gear 7 at its rear end which meshes with a beveled gear 8 on a vertical drive shaft 9 extending through the propeller housing 3, the lower end of the drive shaft being connected to the propeller shaft by suitable bevel gears 10. This is the construction illustrated in the above mentioned patents.

As stated above, one purpose of the present invention is to provide an improved manner of mounting the propeller housing 3 on the base 11 of the supporting frame so as to provide for both the swinging movement of the propeller housing about a horizontal axis and its swinging movement about a vertical axis.

In accordance with the present invention the propeller housing 3 is mounted on a supporting member which in turn is pivotally mounted on the base 11 to turn about a horizontal axis and the propeller housing is pivotally mounted on the supporting member to turn about a vertical axis other than the axis of said member.

In the construction shown in Figs. 1–22 the supporting member is a gimbal-like element, one form of which is indicated at 12 in Fig. 5. This gimbal member is provided with a set of alined pivotal elements, which are herein shown as trunnions 13 and which define a horizontal axis, and also with a second set of alined pivotal elements herein shown as trunnions 14, 15 and which define a vertical axis.

The first set of alined pivotal elements 13 are mounted in suitable bearings 14a carried by the supporting base 11 and thereby provide for swinging movement of the supporting member 12 about said horizontal axis.

The propeller housing is mounted on the second set of pivotal elements 14, 15 to turn about said vertical axis for steering the vessel, and for this purpose there is shown a mounting member 16 which is rigid with the propeller housing 3 and extends forwardly therefrom. Said mounting member 16 is shown as comprising two plates 17, each having an upper and a lower forwardly extending arm, the upper arms being indicated at 18, and the lower arms at 19. The upper arms 18 carry at their outer ends a transversely extending bearing member 20 having an opening 23 to receive the upper trunnion 14, and the lower arms 19 of the side plates 17 are similarly connected by a transversely extending lower bearing member 21 having an opening 22 to receive the lower trunnion member 15. The side pieces 17 are rigidly secured together by transversely extending plates 24 which are riveted or welded to the side members.

The mounting member 16 may be connected to the propeller housing 3 in any suitable way. As herein shown the housing is provided at its upper portion with two oppositely disposed laterally extending flanges 24a, and each of the side pieces 17 has at its rear edge a laterally extending flange 25 which mates a flange 24, said flanges 24 and 25 being riveted or welded together.

With this construction the vertical axis about which the propeller housing turns for steering the boat coincides with the axis of the vertical trunnions 14 and 15 and such axis is located some distance in front of the axis about which the drive shaft 9 rotates.

The supporting member or gimbal member 12 is provided with a central opening 26 through which the power shaft 6 extends, said shaft being supported separately and independently from the gimbal member 12. In order to permit free turning movement of the gimbal member about its horizontal axis the portion 7 of the power shaft 6 which extends through the opening 26 is a flexible section which includes two universal joints 28 and 29, one located on the front of the gimbal member 12, and the other at the rear thereof. The member 30 of the front universal joint is provided with an end portion 31 which telescopes into a tubular end portion 32 forming part of the member 33 of the universal joint 29. The end portions 31 and 32 are so connected that they are compelled to rotate in unison but can move relatively to each other in an axial direction. For this purpose the member 31 is shown as having grooves extending longitudinally thereof into which fit ribs formed on the interior of the tubular member 32.

When the propeller housing 3 is swung into its raised position shown in dotted lines Fig. 2, the universal joints 28, 29, maintain a driving connection between the power shaft and the drive shaft 7 in all positions which the propeller housing may assume during its swinging movement, and the telescopic connection between the members 31, 32, provide for the necessary extension or contraction of the power shaft during such swinging movement. The flexible section 27 of the power shaft 6 with its universal joints 28, 29 also provides for the swinging movement of propeller housing about the vertical axis for steering the boat. Attention is again called to the fact that the driving connection for operating the propeller and which includes the power shaft 6 is separate and independent from the supporting member or gimbal member 12, but is constructed so as to provide for the swinging movement of said member 12 about its horizontal axis.

Various means may be employed for swinging the gimbal member about its horizontal axis for the purpose of raising the propeller from the water or lowering it back into the water. In the construction shown in Figs. 1 and 2 this swinging movement is obtained by the operation of two hydraulic jack members 34, 35, each jack member comprising a cylinder 36 in which operates a piston, the piston rod 37 of which extends beyond the cylinder and is pivotally connected to the end portion 38 of an arm 39 which is rigid with the gimbal member 12. The jacks 34, 35, can be operated by any suitable well known valve mechanism. When the propeller housing 3 is to be raised fluid under pressure will be admitted to the cylinders 36 so as to move the pistons toward the left, Fig. 2, and this operation will swing the gimbal member 12 about its horizontal trunnions 13, thereby raising the propeller housing. A movement of the pistons of the jacks in the opposite direction will, of course, lower the propeller housing and bring it back into its normal vertical position.

Various means may be employed for turning the mounting member 16 and the propeller housing carried thereby about the vertical trunnions 14 and 15 to swing the propeller laterally in one direction or the other for steering the boat, as shown by dotted lines in Fig. 1.

In the construction shown in Figs. 1, 2, 3, and 6, there is provided a reversible motor element 40 which is carried by a supporting bracket 41 extending between and secured to the side pieces 17 of the mounting member 16. This motor is connected to a sprocket wheel 42 that is rotatable about a vertical axis and which engages a sprocket chain 43, one end of which is connected to the gimbal member on one side, as shown at 44, and the other of which is connected to the gimbal member on the other side, as shown at 45. With this construction if the reversible motor 40 is operated to turn the sprocket wheel 42 in a clockwise direction, Fig. 1, said sprocket wheel will tend to walk along the upper run of the chain 43 and since said chain is anchored to the gimbal member this operation will cause the sprocket wheel and hence the mounting member 16 to swing counterclockwise about the vertical trunnions 14 and 15, thereby swinging the propeller into the upper dotted line position Fig. 1.

On the other hand, if the sprocket wheel 42 is rotated in a counterclockwise direction said sprocket wheel will tend to walk along the lower run of the chain 43 (Fig. 1) which will result in swinging the mounting member and the propeller housing downwardly into the lower dotted line position Fig. 1.

In Figs. 8 to 12 there is shown a different embodiment of the invention wherein the power shaft is connected to the propeller shaft by a sprocket chain drive instead of the drive shaft shown in Fig. 1. In this embodiment the rear end of the drive shaft is provided with a sprocket wheel 46 which is connected by a sprocket chain 47 to a sprocket wheel 48 carried by the propeller shaft 4. In this embodiment the propeller housing, which houses the sprocket chain 47, is a divided housing, it having two hollow sections 49 each of which houses one of the vertical runs of the chain 47.

In other respects the construction shown in Figs. 8 to 12 is similar to that illustrated in Figs. 1 to 6.

In Figs. 13 to 15 there is shown an embodiment of the invention in which the hydraulic jacks can be operated not only to give the propeller housing a swinging movement about a horizontal axis, but also to turn the propeller housing about its vertical axis. In this embodiment of the invention the power shaft and its connection with the drive shaft are the same as that shown in Fig. 1. The mounting member, which is indicated at 16a in Figs. 13 to 15, is provided at its upper end with two oppositely disposed arms 50, 51, the arm 50 being pivotally connected to the piston rod 37a of an hydraulic jack 34a and the arm 51 being pivotally connected to the end of the piston rod 37b of the hydraulic jack 35b.

Suitable valve mechanism is provided for controlling the operation of the two jacks 34a and 35b so that they may operate simultaneously in the same direction or simultaneously in opposite directions. If the two jacks are actuated so that the pistons of both jacks are moved simultaneously toward the left in Figs. 13 and 14 the gimbal member 12 will be turned about its horizontal trunnions 13 thereby swinging the propeller housing upwardly into the dotted line position Fig. 13.

If, however, the jacks are so operated that the piston of the jack 34a is moving to the right and the piston of the jack 35b is moving to the left, then the propeller housing and propeller will be swung into the lower dotted line position Fig. 14, while if the two jacks are so actuated that the piston of the jack 34a is moving to the left and the piston of the jack 35b moving to the right, Fig. 14, then the propeller housing will be swung upwardly into the upper dotted line position.

These desired movements of the two jacks may be provided for by the use of any suitable valve.

In Figs. 19 to 22 there is illustrated more or less diagrammatically a control valve and its connections by which the operation of the hydraulic jacks 34a and 35b can be controlled as above described. These figures are diagrammatic figures only and in said figures only the jacks 34a and 35b are illustrated without showing their connection to the mounting member.

The valve shown for controlling the jacks is illustrated generally at 69 and it comprises a valve casing 70 within which operates a valve plug 71. The valve casing is shown as having a pair of ports 72, 73, the port 72 being connected by a pipe connection 74 with the left hand end of jack 34a, and the port 73 being connected by a pipe connection 75 with the left hand end of jack 35b. The valve casing is also provided with a second pair of ports 76, 77, the port 76 being connected by a pipe connection 78 to the right hand end of jack 34a and the port 77 being connected by a pipe connection 79 to the right hand end of jack 35b. The pipe connections 74, 75, 78 and 79 are shown diagrammatically by full lines in Fig. 19 and in dotted lines in Fig. 20.

The valve casing is also provided with an inlet port 90 to which is connected an inlet pipe 91, and an outlet port 92 to which is connected a discharge pipe 93.

The valve plug has two ducts 94, 95, the duct 94, when the plug is in the position shown in Fig. 19, establishing a communication between the inlet port 90 and the ports 76, 77, and the duct 95 establishing communication between the ports 72, 73, and the discharge port 92. When in this position the fluid under pressure from the inlet pipe 91 will be delivered into the right hand end of both jack cylinders and the left hand end of both cylinders will be connected through the pipes 74, 75 to the duct 95 which is in communication with the discharge port 92, and hence the pistons of both of the jacks will be moved toward the left simultaneously. This will result in raising the propeller from the water.

By turning the plug 71 through 90° to place the plug ports 94, 95 in the position shown in dotted lines, Fig. 19, the valve will be reversed so that fluid under pressure will be delivered from the inlet port 90 to the left hand end of both jack cylinders through pipe connections 74, 75, and the right hand end of said cylinders will be connected to the discharge port 92 through pipe connections 78, 79, so that the gimbal member will be given a turning movement which will lower the propeller into the water.

For operating the jacks simultaneously, but in opposite directions, the valve casing 70 is provided with two other pairs of ports 80, 81, and 84, 85, which are situated below the ports 72, 73, and 76, 77, the port 80 being connected by a pipe connection 82 with the left hand end of jack cylinder 34a, and the port 81 being connected by a pipe 83 with the right hand end of jack cylinder 35b. The port 85 is also connected by a pipe connection 86 with the left hand end of jack cylinder 35b, and the port 84 is connected by a pipe connection 87 to the right hand end of jack cylinder 34a. The pipe connections 82, 83, 86 and 87 are shown in full lines in Fig. 20 and in dotted lines in Fig. 19. The valve plug 71 is capable not only of turning movement, but of axial movement, and when it is in the full line position shown in Fig. 21 the ducts 94, 95 therein are in communication with the pipe connections 74, 75, and 78, 79, and the ports 80, 81, 84 and 85 are closed by the lower end 100 of the plug. When the plug is in this position the turning movement thereof will result in moving the pistons of the two jacks simultaneously in the same direction. However, by moving the plug 71 downwardly within the casing 70 into the dotted line position Fig. 21 the ducts 94, 95 therein will be brought into communication with the ports 81, 82, and 84, 85, and the ports 72, 73, 76, 77 will be closed by the upper portion 101 of the valve plug 71. The inlet pipe 91 is provided with a branch connection 96 leading to an auxiliary inlet port 97 directly below the inlet port 90, and the discharge pipe 93 is also provided with a branch 98 leading to an auxiliary discharge port 99 directly beneath the discharge port 92. When the valve plug 71 is in its raised position, the auxiliary ports 97, 99 are closed by the lower end 100 of said plug and the supply of fluid under pressure to the jack cylinders and discharge therefrom takes place through the inlet and discharge ports 90 and 92, while when the valve plug is in its lowered position shown in dotted lines, Figs. 21 and 22, the inlet and discharge ports 90, 92 are closed by the upper end of the plug and the ducts 94, 95 are in positions to register with the auxiliary ports 97 and 98 as well as the ports 80, 81, 84, and 85.

Hence, when the valve plug is in its raised position, it functions to move the jack pistons simultaneously in the same direction, and when said plug is in its lowered position it functions to move the jack pistons simultaneously but in opposite directions.

Any other suitable valve mechanism may be employed for this purpose.

In Figs. 16 and 18 there is shown still another embodiment of the invention in which the turning movement of the propeller housing and its mounting member about the vertical axis for steering the boat is accomplished through the medium of a steering wheel.

In this embodiment the gimbal-like member is indicated at 12a and the horizontal trunnions 13a are located near the top thereof, said gimbal member having the upper and lower vertical trunnions 14a and 15a, as shown in Fig. 5. In the embodiment of Fig. 16, however, the hydraulic jack for controlling the swinging movement of the gimbal member about its horizontal trunnions is connected to the lower end of said gimbal member. Such hydraulic jack is indicated at 52 in Fig. 16, it being shown as pivotally connected at 53 to the lower end of the gimbal member.

In this embodiment the mounting member 16c has rigid therewith at its upper end a worm gear 54 which is mounted on the upper trunnion 14a of the gimbal-like member 12a. This worm gear 54 meshes with a worm 55 carried by a transverse shaft 56 that is supported in suitable bearings carried by the gimbal member, and said shaft 56 has at its outer end a sprocket wheel 57 which is connected by a sprocket chain 58 with a sprocket wheel carried by a shaft 59 which is supported in stationary bearings 61 and is located coaxially with the horizontal trunnions 13a. The shaft 59 has a sprocket wheel thereon which is connected by a sprocket chain drive to a steering wheel 64. This sprocket chain drive comprises a sprocket chain 65 connecting the sprocket wheel on shaft 59 with a sprocket wheel 66 and the sprocket wheel 66 has rigid therewith another sprocket wheel which is connected by the sprocket chain 67 with the steering wheel 64. With this construction the turning of the steering wheel 64 will operate to rotate the transverse shaft 56, thereby turning the worm gear 54 and causing the mounting member 16c with its propeller housing to be swung about the vertical axis of the vertical trunnions. By mounting the shaft 59 in axial alinement with the horizontal trunnions of the gimbal member the steering mechanism will not be effected by the swinging movement of the gimbal member 12a and said steering mechanism will remain operative in all positions which the propeller housing may assume during its upward swinging movement.

In Figs. 23, 24, and 25 there is illustrated a different embodiment of the invention in which the vertical axis about which the propeller housing turns for steering the boat is located between said housing and the horizontal axis about which the housing turns for raising the propeller from the water.

In said figures, 11c indicates a portion of the supporting base which is mounted on the deck of the scow or other boat, 3c indicates the upper portion of the propeller housing in which is located the vertical drive shaft 9c, said shaft being driven from the power shaft 6c as described in other embodiments of the invention. Shaft 6c is provided with universal joints 28c and 29c to provide for the swinging movement of the housing about both the horizontal axis and the vertical axis.

The supporting base 11c is shown as formed with two side members 108 which are connected by a cross member 107. The supporting member on which the propeller housing is mounted for turning about a vertical axis is shown at 12c, and it also comprises two side members 100 which are connected by a transverse member 101 and a bottom member 102. The supporting member is pivotally mounted on the supporting base 11c by means of a transverse pivotal shaft 13c which extends through the side members 108 of the supporting base and the side members 100 of the supporting member. The supporting base is shown as having wing extensions 106 between which the supporting member is received.

The propeller housing 3c is mounted on the supporting member 12c through the medium of mounting means including two arms 18c and 19c which are rigid with the housing 3c and which extend therefrom. These arms are pivotally mounted on a vertical pivotal shaft 109 which is carried by the supporting member 12c As herein illustrated, the shaft 109 is mounted in two transversely extending bearing members 103, 104 which extend from one side 100 to the other side 100 of the supporting member. This pivotal shaft 109 is located in the rear of the horizontal pivotal shaft 13c and in front of the propeller housing.

Any suitable means may be employed for turning the propeller housing 3c about the pivotal shaft 109 for the purpose of steering the boat. One construction for this purpose includes a worm gear 110 which is rigid with the upper arm 18c of the mounting means and which is engaged by a worm 111 fast on a shaft 112 that extends transversely across the supporting member and is journaled in the sides 100 thereof. Said shaft 112 extends beyond the supporting member at one side, as shown at 120, and said extension has rigidly mounted thereon a sprocket wheel 113 which is connected by a sprocket chain 114 with a sprocket wheel 116 that is loosely mounted on a shaft extension 115 that is co-axial with the pivotal shaft 13c, said shaft extension being carried by the supporting base. The sprocket wheel 116 has rigid therewith another sprocket wheel 117 which is connected by a sprocket chain 118 with any suitable steering wheel. Since the shaft extension 115 is coaxial with the pivotal shaft 13c, the steering mechanism will remain operative in any adjusted position of the propeller housing 3c about its pivotal axis 13c.

Any suitable means for swinging the supporting member 12c about its horizontal axis 13c may be employed without departing from the invention. One simple means for this comprises two hydraulic jacks 34c, 35c, arranged on opposite sides of the supporting base 11c and having piston rods 37c which are connected to arms 105 that are rigid with the sides 100 of the supporting member 12c and extend laterally therefrom.

When the two jacks 34c and 35c are operated to move the piston rods 37c to the right, the supporting member 12c will be swung upwardly about its pivotal axis 13c, as shown in dotted lines Figs. 23 and 25. In this embodiment of the invention the power shaft 6c is separate and independent from the supporting member 12c and said supporting member has an enlarged opening through which the flexible portion of the power shaft 6c extends.

I claim:

1. An outboard propeller mechanism for sea-going vessels comprising a supporting base adapted to be mounted on the deck of the vessel, an outboard vertically disposed propeller housing carrying a propeller at its lower end, means mounting the propeller housing on the supporting base, said means comprising a unitary supporting member situated in front of the propeller housing and having a first set of alined pivotal elements defining a horizontal axis and a second set of alined pivotal elements defining a vertical axis which is located in front of the propeller housing, a mounting member rigid wtih the propeller housing and extending forwardly therefrom toward the supporting member, means supporting the mounting member on the second set of pivotal elements to provide for swinging movement of the propeller housing about said vertical axis for steering the vessel, means mounting the first set of pivotal elements on the supporting base to provide for swinging movement of the supporting member and the propeller housing as a unit about said horizontal axis, a motor mounted on the supporting base, and driving connections between the motor and the propeller, said connections being separate and independent from the supporting member and thereby operative in all positions which the propeller housing assumes.

2. An outboard propeller mechanism for sea-going vessels comprising a supporting base adapted to be mounted on the deck of the vessel, an outboard vertically disposed propeller housing carrying a propeller at its lower end, means mounting the propeller housing on the supporting base for swinging movement about an horizontal axis to raise the propeller from and lower it into the water and also for swinging movement about a vertical axis for steering the boat, said means comprising a gimbal member having oppositely disposed axially alined horizontally extending trunnions, bearings carried by the supporting base in which said trunnions are journaled to provide for turning movement of the gimbal member about an horizontal axis, said gimbal member having axially alined top and bottom trunnions the common axis of which is at right angles to and intersects that of the horizontally extending trunnions, and a mounting member rigidly secured to the propeller housing and mounted on the top and bottom trunnions for turning movement thereabout.

3. An outboard propeller mechanism as defined in claim 2, in which the mounting member is rigidly secured to the propeller housing and has a forwardly projecting upper arm and a forwardly projecting lower arm, said upper arm having a bearing member mounted on the upper trunnion and the lower arm having a bearing member mounted on the lower trunnion, whereby the mounting member and the propeller housing secured thereto may be turned about the common axis of the top and bottom trunnions for steering the vessel.

4. An outboard propeller mechanism as defined in claim 2, and which includes means acting on the gimbal member to turn it about its horizontal axis for raising the propeller from the water and lowering it thereinto, and means acting on the mounting member to turn it and the propeller housing about the top and bottom trunnions for steering the vessel.

5. An outboard propeller mechanism as defined in claim 2, and which includes a pair of hydraulic jacks connected to the mounting member above the horizontal axis of the gimbal member and on opposite sides of the common axis of the top and bottom trunnions thereof, and means for operating said jacks simultaneously in either the same direction to swing the gimbal member about its horizontal axis, or in opposite directions to turn the mounting member and the propeller housing about the top and bottom trunnions of the gimbal member for steering the vessel.

6. An outboard propeller mechanism as defined in claim 2, and which includes a pair of hydraulic jacks connected to the mounting member above the horizontal axis of the gimbal member and a reversible valve member and pipe connections for controlling the delivery of the jack operating fluid to the jacks to cause them to operate either simultaneously in the same direction for swinging the gimbal member about its horizontal axis or simultaneously in opposite directions for turning the mounting member about the top and bottom trunnions of the gimbal member for steering the vessel.

7. An outboard propeller mechanism as defined in claim 2 and which includes a pair of hydraulic jacks connected to the mounting member on opposite sides of the common axis of the top and bottom trunnions of the gimbal member and at points spaced vertically from the horizontal trunnions of the gimbal member, and means for operating said jacks simultaneously in either the same direction to swing the gimbal member about its horizontal axis, or in opposite directions to turn the mounting member and the propeller housing about the top and bottom trunnions of the gimbal member for steering the vessel.

8. An outboard propeller mechanism for sea-going vessels comprising a supporting base adapted to be rigidly mounted on the deck of the vessel, a vertically disposed propeller housing carrying a propeller at its lower end, means mounting the propeller housing on the supporting base for swinging movement about an horizontal axis to raise the propeller from and lower it into the water, and also for swinging said propeller housing about a vertical axis which is situated in front thereof for steering the boat, said means comprising a supporting member, means mounting the supporting member on the supporting base for turning movement about said horizontal axis, a mounting member rigidly secured to the propeller housing and extending forwardly therefrom, means pivotally mounting the mounting member on the supporting member for turning movement about said vertical axis, said supporting member having an opening therethrough, and a power shaft operatively connected to the propeller and extending from the front to the rear of said supporting member and through said opening.

9. An outboard propeller mechanism for sea going vessels comprising a supporting base adapted to be mounted on the deck of the vessel, an outboard vertically disposed propeller housing carrying a propeller at its lower end, means mounting the propeller housing on the supporting base, said means comprising a unitary supporting member situated in front of the propeller housing and having a first set of alined pivotal elements defining a horizontal axis and a second set of alined pivotal elements defining a vertical axis which is located in front of the propeller housing, a mounting member rigid with the propeller housing and extending forwardly therefrom toward the supporting member, means supporting the mounting member on the second set of pivotal elements to provide for swinging movement of the propeller housing about said vertical axis for steering the vessel, means mounting the first set of pivotal elements on the supporting base to provide for swinging movement of the supporting member and the propeller housing as a unit about said horizontal axis, a motor mounted on the supporting base, driving connections between the motor and the propeller, said connections being separate and independent from the supporting member and thereby operative in all positions which the propeller housing assumes, and a mounting member rigidly secured to the propeller housing and which has a forwardly projecting upper arm and a forwardly projecting lower arm, said arms being pivotally connected to the supporting member to turn about a common vertical axis.

References Cited in the file of this patent

UNITED STATES PATENTS

| | | |
|---|---|---|
| 2,112,466 | Maloon | Mar. 29, 1938 |
| 2,335,597 | Mathewson | Nov. 30, 1943 |
| 2,398,057 | Straussler | Apr. 9, 1946 |
| 2,536,894 | Wanzer | Jan. 2, 1951 |